PLUG VALVES
Filed March 4, 1964 2 Sheets-Sheet 1
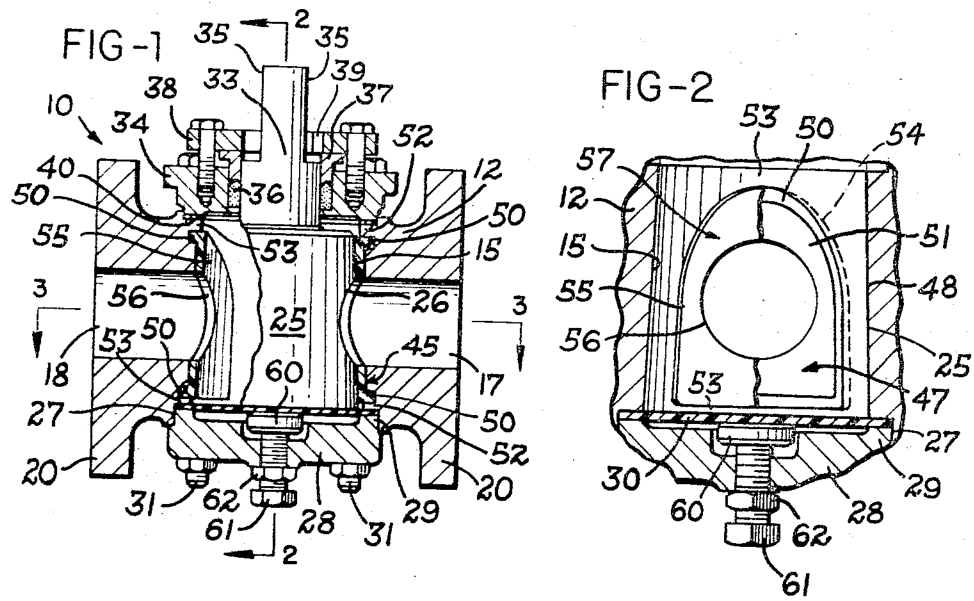
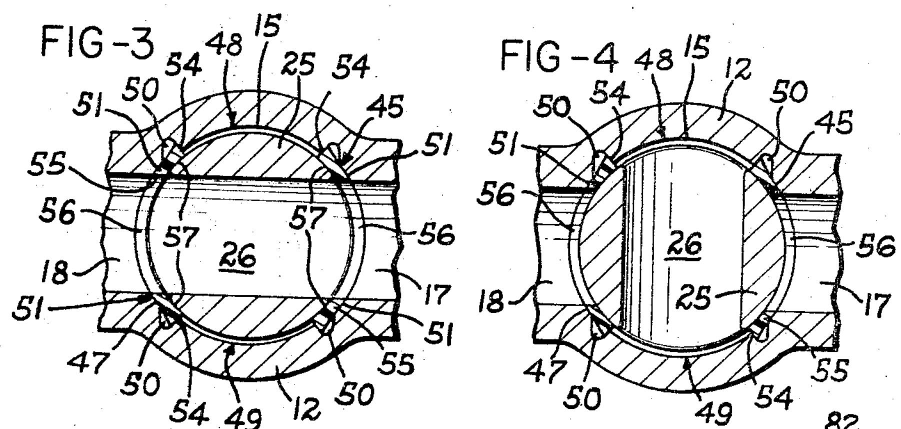
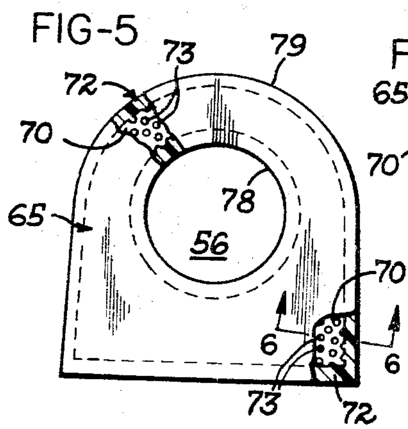
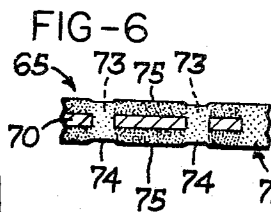
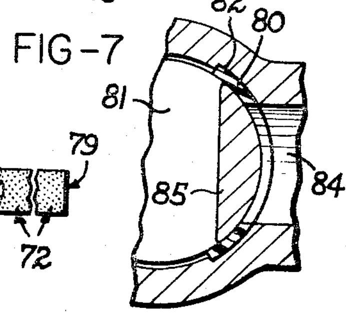
INVENTOR.
BY JACOB B. FREED
Marechal, Biebel, French & Bugg
ATTORNEYS

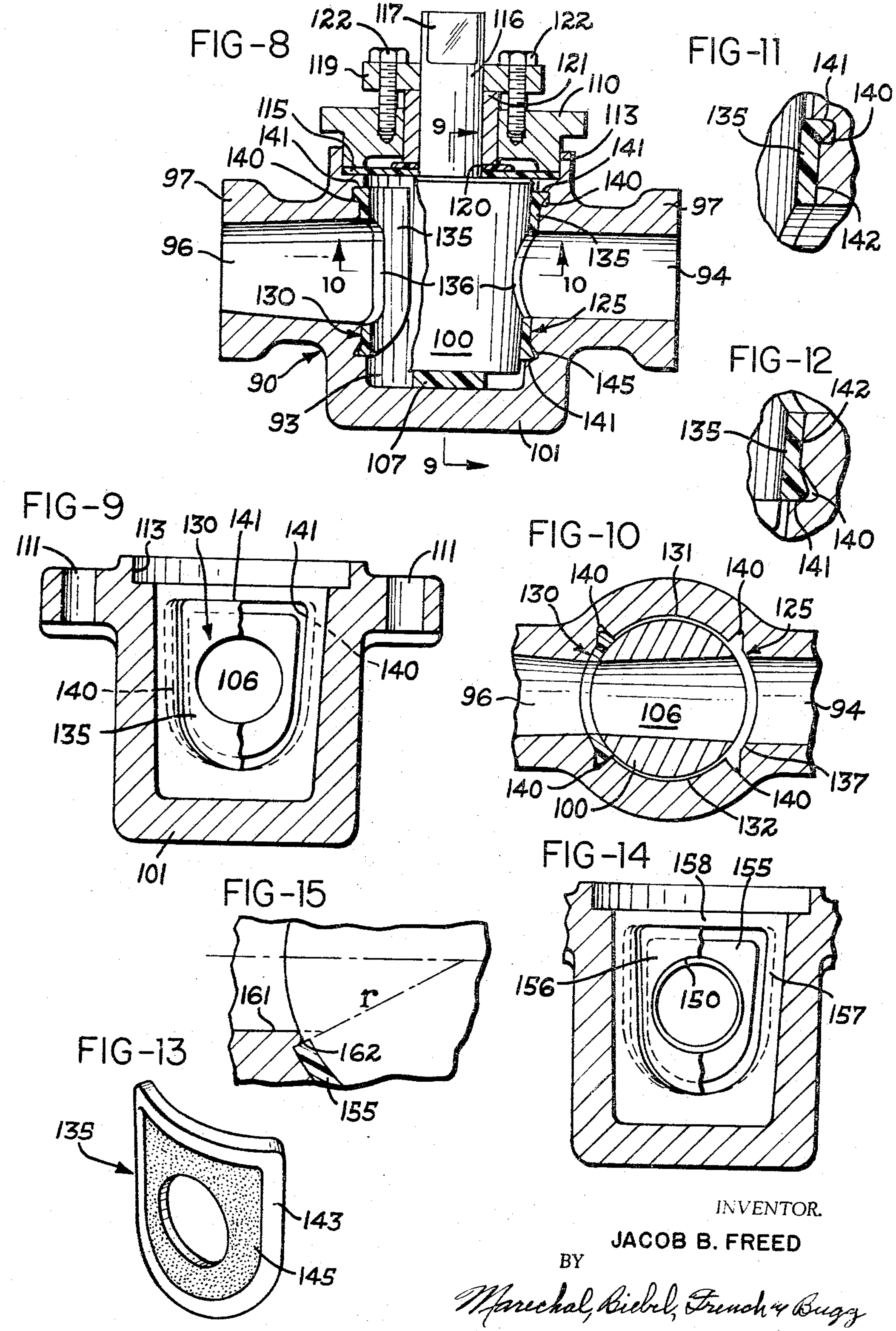
INVENTOR.
JACOB B. FREED
BY
Marechal, Biebel, French & Bugg
ATTORNEYS

United States Patent Office 3,326,519

Patented June 20, 1967

3,326,519

PLUG VALVES

Jacob B. Freed, Battle Creek, Mich., assignor to The Duriron Company, Inc., Dayton, Ohio, a corporation of New York Filed Mar. 4, 1964, Ser. No. 349,232
9 Claims. (Cl. 251—317)

This application is a continuation-in-part of application Ser. No. 217,884, filed Aug. 20, 1962, and now abandoned.

This invention relates to corrosion resistant plug valves.

Plug valves intended for use in systems handling corrosive fluids have been fabricated of corrosion resistant materials such as plastics of the epoxy resin or modified epoxy resin type such as that available under the trademark Durcon. Other corrosion resistant materials which may be similarly employed include glass and corrosion resistant metals or metal alloys such as those available under trademarks Durco, Durichlor, Durimet-20 and Duriron. The above types of materials are characterized by the fact that they are generally shaped by a casting or molding operation often requiring a subsequent machining or grinding step to finish the interior bore of the body. Glass and the above mentioned metal alloys, Duriron and Durichlor, are characterized by a somewhat brittle nature which renders a machining operation quite difficult, and since any finishing operation generally involves grinding the surfaces of the valve body, such operations, especially grinding the interior of the valve body to relatively close tolerances, may require considerable manufacturing expense.

In an attempt to avoid the difficulty associated with the above materials, a second class of valves has been developed generally utilizing a machinable valve body having a liner positioned between the bore and the plug of the valve, and valves of this second class are generally referred to as sleeve valves. The sleeve in such valves is usually a corrosion resistant plastic having a low coefficient of friction such as the polyethylene plastics or derivatives thereof and particularly the fluorocarbon resins of the type available under the trademark Teflon, Kel–F or F.E.P. Valves of the sleeve type are described, for example, in U.S. Patents 2,713,987; 2,728,550; 2,729,420; 2,776,104; 2,913,269; 2,961,214 and 2,987,295 all assigned to the same assignee as this application.

While the sleeve valves described in the above patents operate satisfactorily insofar as corrosion resistant characteristics are concerned, certain difficulties must be overcome in the manufacture and servicing of such valves. For example, the sleeve should be positioned within the bore so as to be nonrotatable and preferably should be maintained in a confined condition so as to minimize the effects of cold flow. Flow or distortion of the sleeve may also occur in some of the sleeve valves when the valves are exposed to a temperature cycle, that is, if the temperature is elevated to a high degree and then lowered again, the expansion and contraction of the valve sleeve may cause the valve to leak.

Satisfactory results from the standpoint just discussed have been obtained by a sizing operation in which the sleeve is fitted within the bore of the valve and maintained in confined condition such that cold flow, or flow thereof resulting from the temperature cycling operation is substantially eliminated. Such a sizing operation is described for example in Patent 2,961,214, previously mentioned, and involves the use of axial force to position the sleeve within the valve bore. Due to the pressure created along the surface of the wall of the bore, the body of the valve must be capable of withstanding considerable pressure, and materials which are brittle such as glass or the metal alloys previously described may not be readily utilized in such a construction. A similar sizing operation is required if the liner sleeve should require replacement, which increases the cost of servicing such valves. Also, while valves of this general type are frequently described as having low turning torque, the force required to turn the plug increases as the size of the valve increases. It would be advantageous to provide a valve wherein high sealing pressure is obtained and wherein the turning torque is reduced. It could also be an advantage to be able to assemble the valve easily and replace the seal element without the necessity of utilizing a sizing operation as has been done heretofore.

Accordingly, this invention has for its primary object the provision of an improved corrosion resistant plug valve of relatively low turning torque and which is relatively easy to manufacture and repair.

Another object of the invention is the provision of a corrosion resistant plug valve wherein a pair of inserts having a relatively low coefficient of friction are positioned within the clearance between the bore and plug and operate to maintain the plug in spaced relation to the bore while engaging a portion of the opposed surfaces in the clearance to provide substantial reduction of the turning torque of the plug while maintaining an efficient seal over a substantial temperature range.

Still another object of the invention is the provision of a plug valve of reduced turning torque wherein the plug of the valve is engaged by spaced plastic members having a relatively low coefficient of friction with respect to the plug, and wherein the members are maintained in a substantially completely confined condition within the bore of the valve for minimizing the effects of cold flow.

Another object of the present invention is the provision of a corrosion resistant plug valve wherein a pair of fluorocarbon resin plastic inserts are so received within a pair of recesses in the bore that the plug of the valve is maintained in spaced relationship to the bore thereby eliminating machining and grinding operations thereof, and wherein the dimensions of the inserts are so correlated and coordinated with the dimensions of the plug and the recesses as to engage the outer surface of the plug in sealing engagement when the plug is in the closed position.

A further object of the invention is to provide a plug-valve having a pair of inserts of fluorocarbon material received within pockets in the bore and between the bore and the plug for maintaining the plug in spaced relation to the inner surface of the bore, and wherein each pocket includes an expansion chamber which preferably extends all the way around the pocket to compensate for changes in dimension of the insert due to changes in temperature.

Other objects and advantages of the invention will be apparent from the following description, the accompanying drawings and the appended claims.

In the drawings:

FIG. 1 is a view partly in section and partly in elevation of an improved plug valve constructed in accordance with the invention wherein a portion of the plug has been broken away for purposes of illustration;

FIG. 2 is a section on the line 2—2 of FIG. 1 with portions of the plug broken away showing a portion of an insert which is received within the bore of the valve;

FIG. 3 is a section on the line 3—3 of FIG. 1 showing the relationship of the plug, inserts and the bore with the plug in open position;

FIG. 4 is a view similar to FIG. 3 showing the plug in the closed position;

FIG. 5 is a plan view with portions thereof broken away of an improved insert member constructed in accordance with the invention;

FIG. 6 is a view in section along the line 6—6 of FIG. 5 illustrating the density distribution of an insert constructed in accordance with the invention;

FIG. 7 is a fragmentary view similar to that shown in FIG. 4 illustrating the correlation and coordination of the dimensions of the insert with respect to the plug and the valve bore;

FIG. 8 is a view partly in section and partly in elevation of another plug valve in accordance with the present invention wherein a portion of the plug has been broken away for purposes of illustration;

FIG. 9 is a sectional view along the line 9—9 of FIG. 8 with a portion of the insert broken away to show the interior portion of the body bore;

FIG. 10 is a sectional view along the line 10—10 of FIG. 8;

FIG. 11 is an enlarged fragmentary view of a portion of the upper section of the pocket and insert;

FIG. 12 is an enlarged fragmentary view of a portion of the lower section of the pocket and insert;

FIG. 13 is a view in perspective of an insert in accordance with the present invention;

FIG. 14 is a view partly in section and partly in elevation with a portion of the insert broken away of another form of plug valve in accordance with the present invention; and FIG. 15 is an enlarged fragmentary sectional view showing the details of the annular shoulder shown in FIG. 14.

Referring to the drawings, which illustrate preferred embodiments of the invention, the valve 10 shown in FIGS. 1 and 2 includes a valve body 12 having a conical bore 15 extending transversely therethrough from the top of the body and preferably of a tapered configuration. It should be noted that the term "bore" is used to identify the cavity within the body and does not necessarily mean that this portion of the body is formed by boring or other machining operations. Ports 17 and 18 open into the bore 15 from opposite sides of the valve body, and flanges 20 are provided at the outer ends of the ports for attachment to pipes in the conventional manner.

Positioned within the bore 15 is a valve plug 25, preferably tapered and having a radial dimension which is sufficiently smaller than the radial dimension of the bore so as to establish an annular clearance therebetween. The plug 25 includes a through port 26 adapted for alignment with the body ports 17 and 18. The lower end of the valve body 12 is provided with a circumferential shoulder 27 to receive a cap 28 which includes a boss portion 29 received within the recessed shoulder 27. Between the boss and the shoulder there is positioned a sealing diaphragm 30 which is secured in position on the body 12 by a plurality of bolts 31 in the usual way.

The smaller end of the plug 25 includes a stem portion 33 which projects through a retainer 34 mounted similarly to the cap 28 on the body 12, and the outer end of the stem 33 is provided with flats 35 on each side thereof for interlocking engagement with an operating handle in the usual way. The retainer 34 supports a sealing ring 36, gland 37 and gland follower 38, and the gland follower 38 includes a shoulder 39 adapted for engagement by the flats 35 on the stem 33 to limit turning movement of the plug 25 to 90° thereby to define the opened and closed positions of the valve. The retainer 34 also cooperates with a gasket 40 to seal the upper end of the body 12.

As shown in FIGS. 1–4 for example, means are provided in the bore of the valve defining recesses 45 and 47 which surround plug ports 17 and 18 respectively, to form spaces or pockets within the bore which have radial dimensions greater than the radial dimensions of the nonrecessed areas 48 and 49 of the bore. Each of the recesses or pockets includes a communicating expansion chamber 50 which surrounds the corresponding body port and which is spaced therefrom to provide a continuous high pressure sealing area 51 which preferably completely surrounds the corresponding body port. The radial dimension of the expansion space is greater than that of the high pressure sealing area 51 which in turn is greater than that of the bore 15. The pockets 45 and 47 are also so disposed in the bore relative to the ports as to provide surrounding shoulders 52 and 53, respectively for each pocket. Each shoulder surrounds the corresponding pocket and has radial dimensions corresponding to the radial dimension of the bore.

Associated with each pocket and with the corresponding expansion chamber for each pocket is a radially extending peripheral wall 54 which borders or extends substantially all the way around each pocket. Received within each recess is a plastic insert or member 55 having a port 56 therein matching the body port to allow flow of fluid through the valve when the plug is in the open position as illustrated.

Each of the inserts 55 includes an inner sealing surface 57 which engages the plug along a portion of the outer surface thereof and which surrounds the plug port when the plug is in the open position. These inserts are so dimensioned with respect to the plug ports that as the plug is rotated to the closed position as shown in FIG. 4, a sufficient quantity of material is present to engage the surface of the plug between the ports thereof in sealing engagement. The thicknes dimension of each of the inserts is correlated with the radial dimensions of the bore and recesses so that when positioned in the recess, the insert will project into the annular clearance between the plug and bore and maintain the plug spaced from the bore as shown in FIGS. 3 and 4. In other words, the cross sectional thickness of the insert is greater than the difference in radial dimensions between the pockets and the bore.

As shown in FIGS. 3 and 4, the circumferential dimensions of the pocket and insert are proportioned to provide at snap fit in the pocket, with the outer peripheral edges of the insert engaging the corresponding radially extending peripheral wall. The recesses 45 and 47 are formed only along a portion of the periphery of the bore 15 and only along a portion of the axis of the bore, as seen in FIG. 2, and the surface area of the insert is coordinated and correlated to engage a minimum area of the outer surface of the plug to provide for a relatively low turning torque while maintaining an efficient seal between and around the plug ports. As shown, the insert engages the surface of the plug only along a portion of the outer periphery and a portion along the axis thereof. Additionally, the thickness of the inserts is preferably such as to maintain the plug in spaced relationship to the nonrecessed sections of the bore thereby eliminating any requirement for grinding or machining the bore surface as will be described more fully hereinbelow.

Adjustable pressure is maintained on the larger end of the plug at the base of the valve through diaphragm 30 by means of a thrust member 60 and a pressure screw 61 threaded through the cap 28. A lock nut 62 is provided to lock the screw 61 once the proper axial pressure has been applied to the plug. The application of axial force to the plug results in the generation of a force vector directed radially outward of the center of the plug so as to seat the inserts properly in the recess thereby providing a continuous high pressure seal area which completely surrounds the corresponding plug part, the high pressure seal area in turn being surrounded by the expansion chamber which provides a low pressure seal area.

As best seen in FIG. 2, the recesses are of such a configuration that as the axial force is applied, the insert will not move radially or axially because of the radially extending peripheral wall 54. That portion of the expansion chamber which is circumferentially disposed relative to the body ports also tends to assist in smooth movement of the plug from the closed position to the open position. Referring to FIGS. 3 and 4, as the trailing edge of the plug along the upstream side passes over the peripheral edge of the insert in moving to the closed position, the expansion space 50 allows that portion of the insert which is traversed by the plug to deflect slightly back into the expansion space thus tending to prevent snagging of the peripheral edge of the insert by the trailing edge of the plug. A similar situation exists with respect to the trailing edge of the plug on the downstream side since the expansion chamber around the outlet port also allows slight radially outward movement of the portions of the insert overlying the expansion chamber.

The inserts 55 may be fabricated of a corrosion resistant and relatively chemically inert plastic material which provides a low friction surface with respect to the surface of the plug. Satisfactory results have been achieved in accordance with the invention with polyethylene resins or derivatives thereof such as the fluorocarbon resins previously mentioned. In the case of Teflon materials, highly satisfactory results have been achieved and the difficulties associated with cold flow have been substantially eliminated by maintaining each of the inserts in a confined condition within the valve.

In accordance with the present invention, it is preferred that the inserts be made of relatively pure polytetrafluoroethylene. This particular material when compacted and sintered to provide a finished piece exhibits a coefficient of thermal expansion which is substantially higher than most metals, and thus will expand at a rate greater than most metals. For example, the coefficient of thermal expansion of polytetrafluoroethylene is about eight to ten times greater than most grades of steel.

One of the primary advantages of the valve in accordance with the present invention is the provision of an expansion chamber into which the material of the insert may move in response to increases in temperature as opposed to being extruded between the walls of the bore and plug, as may occur when the temperature of the valve is increased. If extrusion occurs and the valve is thereafter cooled, the extruded portion of material will tend to remain displaced and possibly result in a leaky valve at a lower temperature.

Referring again to FIGS. 1 through 4, the expansion chamber 50 which extends all the way around each pocket, as shown, allows expansion of the insert in all directions during increases in temperature, and as the temperature to which the valve is exposed during operation is reduced, the material of the insert is free to contract without substantially changing its dimensions. The peripheral wall 54 which extends all the way around each pocket and which defines a supporting surface for the peripheral edge of the insert is preferably arranged so as to be radially disposed with respect to the center axis of the bore or axis of rotation of the plug. The wall 54 in cooperation with the expansion chamber 50 provides a supporting wall defining the boundary of each pocket or recess.

Referring to FIGS. 5 and 6, the insert 65 therein includes a metal backing or reinforcing member 70 which is preferably wholly enclosed within a body 72 of tetrafluoroethylene resin material. The member 70 includes a multiplicity of perforations 73 through which integral portions 74 of the plastic body project as shown in FIG. 6. The sections 75 overlying the imperforate portions of the backing member are of a density greater than that of the sections overlying the perforate portions 73 thereby providing an insert having a density differential which allows application of considerable pressure normal to the surface thereof without significantly altering the overall dimensions thereof. Under load conditions, the plastic material will flow from the more dense portions to the less dense thereof without significantly altering the overall dimensions thereof. Under load conditions, the plastic material reference is made to the U.S. patent to Reiling, 2,976,093 issued March 21, 1961 to the assignee of this application.

As shown in FIG. 5, the body 72 of the insert extends beyond the backing member 70 so that the inner periphery 78 and the outer periphery 79 of the insert includes a continuous surface of plastic. That is, the surface area of the plastic body 72 is greater than the surface area of the backing member 70 so that none of the metallic backing material is exposed to possible contact with the corrosive material flowing through the valve.

The insert 65 when assembled into a valve body, also provides the continuous high and low pressure sealing areas and inherently allows for expansion in a manner similar to that previously described in connection with FIGS. 1 to 4. The portions 75 of the plastic material overlying the non-perforated portion of the backing member 70 provide high pressure seal areas when compressed between the plug and bore. The high pressure seal areas are continuous because the continuous high density areas 75 overlie the imperforate portions of the backing member 70, with localized low pressure areas being provided by the relatively low density areas 73. A continuous low pressure area is provided on the inner and outer periphery of the insert by the peripheral areas 78 and 79 which do not overlie the backing member. Insert 65 may be used in a valve body which may or may not include the expansion chamber 50 provided in the bore, since the low density peripheral portions of the insert inherently provide an expansion space. If additional expansion space is needed because of increases in the range of operating temperature, a space such as 50 previously described may be used.

The advantages provided by the invention in the valve above described are achieved by fabricating and assembling the valve parts as now described. The inserts 55 may be made by any of the conventional processing techniques of forming polytetrafluoroethylene products while inserts 65 may be produced in accordance with the above noted Reiling patent. Such an operation includes the steps of providing a backing member 70 of the proper size and having a port 56 therein as shown in FIG. 5. Powdered Teflon material is placed in a mold and the backing member placed therein over the powdered material. Thereafter, an additional charge of powdered material is introduced over the backing member so that the perforations and the central aperture are substantially filled. Pressure is applied to the composite assembly to form a preform which is subsequently sintered at a relatively high temperature to coalesce and bond the resin particles to one another resulting in an insert blank. This method may be utilized to produce the insert blanks one at a time or on a batch basis.

The valve body may be formed by a casting or molding operation so as to include recesses surrounding the body ports and having a radially extending peripheral wall on the expansion chamber, as well as inlet and outlet ports as previously described. It is preferred that materials such as the corrosion resistant materials previously mentioned be utilized as the valve body. An important advantage of the invention is that relatively brittle alloys or materials may be utilized as the valve body while eliminating the necessity of machining or grinding operations which might otherwise be necessary to provide a relatively smooth bore for receiving a sleeve.

The insert blank may be manually deformed sufficiently to conform generally to the configuration of the recesses. Thereafter, the insert blank is placed within the recess and a valve plug inserted into the bore. As already noted, the plug is dimensioned with respect to the bore to provide an annular clearance therebetween, and the inserts are so dimensioned with respect to the valve body and the plug that the thickness thereof is greater than the dimension of the annular clearance so that the plug is maintained out of contact with the non-recessed areas of the bore. In this way, a machining operation, or a grinding operation in the case of the more brittle materials, is rendered unnecessary since the bore body and the plug are not in contact.

After the plug is in place, the remaining sub-assemblies may be attached to the valve body including the retainer unit and associated packing as well as the cap assembly and the thrust member. The thrust member 60 is then adjusted to apply the proper axial force to the plug resulting in a radial force being applied to the inserts which accomplishes proper seating of the inserts within the respective recesses and establishes a seal between each insert and the valve body and plug. Following this operation, the port 56 is cut through each of the inserts to provide communication between the plug port and each of the body ports.

The significant advantages achieved by the present invention include ease of manufacturing of the valve due to elimination of costly machining or grinding operation thereby allowing the valve bodies to be formed by a relatively simple casting or molding operation. Thus it is possible to form the valve body of corrosion resistant materials which are inherently brittle, for example the alloys previously mentioned as well as plastics and glass materials. Since the plug surface is engaged at spaced intervals by the insert members, the result is that a smaller surface area of the plug is in contact with the resinous material resulting in considerable reduction in the torque required to turn the valve from one position to the other as compared with a full sleeve in a valve. For example, a two-inch standard sleeve valve requires 30 to 40 foot pounds of torque to rotate the plug while a valve constructed in accordance with the present invention requires only 16 to 18 foot pounds of torque, which is approximately a 50% reduction in torque. This low torque enables the valve of the present invention to be used with glass pipe and thus minimizes the possibility of fracturing or damaging the pipe when rotating the valve from one position to the other.

If necessary, repair or replacement of the inserts may be accomplished easily by disassembling the valve, removing the old inserts, and inserting new inserts without performing a sizing operation such as may have been necessary with the sleeve-lined valves of the prior art.

In instances wherein the turning torque of the valve is not a primary consideration, it is possible to increase substantially the surface area of the insert beyond the minimum required for efficient sealing. Such an arrangement is schematically shown in FIG. 7 which is a simplified showing of a portion of a valve wherein the insert 80 is positioned within the recess 82 surrounding the body port 84 so that as the plug 85 is rotated into the closed position as shown, the ends of the insert will project beyond the edges of the plug port and over-hang the plug ports 81 in the closed position of the plug. With such an arrangement, the advantages previously noted relating to ease of manufacture, use of a brittle corrosion resistant material, and substantial elimination of cold flow along with the ease of servicing the valve are also accomplished.

Referring to FIGS. 8 to 10, which illustrate a somewhat modified structure in accordance with the present invention, the valve 90 includes a metallic body 92 having a conical bore 93 extending transversely therethrough from the top of the body. Inlet and outlet ports 94 and 96 respectively, open into the bore from opposite sides of the valve body, and flanges 97 are provided at the outer ends of ports for attachment to pipes in the conventional manner.

Positioned within the bore 93 is a valve plug 100 preferably tapered and having a radial dimension which is sufficiently smaller than the radial dimension of the bore so as to establish an annular clearance therebetween. The bottom portion of the bore 95 is closed by an integral portion 101 of the body. The plug 100 includes a through port 106 adapted for alignment with the body ports 94 and 96. Positioned between the integral portion 101 and the bottom of the plug is a plastic bumper 107, of polytetrafluoroethylene or the like which provides a bearing surface for rotation of the plug.

The upper end of the valve body 92 is closed by a cap 110 secured to the body as by bolts or other suitable means (not shown) which pass through apertures 111 such that the inner portion of the cap is seated on a shoulder 113 through an annular thrust diaphragm 115. The plug 100 includes a stem 116 which projects through the cap 110 and is provided with flats 117 on each side thereof for interlocking engagement with an operating handle in the usual way. Sealing pressure is applied to the plug 100 by means of a gland 121 which engages the upper surface of the plug through a diaphragm 120 and is forced against the plug by a gland follower 119 adjustably secured to the cap 110 by bolts 122.

As was the case with the valves shown in FIGS. 1 to 4, means are provided in the bore 93 defining recesses 125 and 130 which surround ports 94 and 96 respectively to form spaces or pockets which have radial dimensions greater than the radial dimensions of the non-recessed areas 131 and 132 of the bore. Received in each recess is an insert 135 of the type previously described, having a port therethrough matching the body port and including edge portions 136 which are in contact with the fluid flowing through the valve. The edge portion of the insert in the upstream or inlet side 94 of the valve opposes line pressure, and under certain conditions of pressure, temperature and/or velocity, a portion of the insert may be deflected away from the body and may be caught by the trailing edge of the plug as the valve is closed. For further details as to the relationship between deflection of the insert and the conditions which give rise to this condition, reference is made to U.S. Patent No. 2,987,295 issued June 6, 1961 to Schenck et al. and assigned to the same assignee.

In accordance with the present invention, the valve is so constructed and arranged that during rotational movement of the plug from the open to the closed position, the outlet port of the body closes entirely while the interior of the plug port remains in fluid receiving relation and at a pressure substantially the same as upstream pressure to prevent radially inward movement of the unsupported portion of the insert on the rear side 137 of the inlet port 94. Accordingly, the inlet port 94 is shorter in the direction of the axis of the bore 93 as well as wider in the transverse direction than the outlet port 96, and the area of the ports is preferably equal for improved flow characteristics through the valve. As disclosed in the above identified Schenck et al. patent, other arrangements may be used, for example chamfering the upstream side of the plug, providing a port through the insert in the inlet side which has a transverse dimension slightly greater than that of the inlet body port, or providing a small bleed hole through the plug which operates to maintain the pressure in the plug port substantially the same as the upstream pressure. Means are also provided (not shown) for establishing a limited range of rotational movement of the plug from one direction to the other, as discussed in the said Schenck et al. patent.

Each of the recesses or pockets includes a communicating expansion chamber 140 and a peripheral wall 141 which correspond in location and function to the expansion chamber 50 and wall 54 previously described in FIGS. 1 to 4 and portions of which are shown on an enlarged scale in FIGS. 11 and 12. The pockets or recesses each cooperate with the corresponding expansion chamber 140 to provide high pressure seal areas 142 which substantially completely surround the corresponding plug ports since the radial dimensions of the expansion space are greater than those portions of the pocket which form the high pressure seal area. Since the insert 135 is compressed between the plug and bore to a greater degree than in the areas defined by the expansion space 140, the expansion space provides a low pressure seal area which surrounds the high pressure seal area.

FIG. 13 shows the general configuration of an insert in accordance with the present invention, as for example insert 135 or 50 previously described. When assembled in the valve, the insert includes a peripheral portion 143 which is slightly thicker in section than the portion 145 as shown in FIGS. 11 and 12 and which is received in the expansion space. The bore which may be rough cast as previously described, and the pockets which are preferably cast have a pattern or embossing thereon which is transferred to that surface portion of the insert which is compressed in the pocket by the plug as shown in portion 145.

Referring to FIGS. 14 and 15, a somewhat modified form of valve is shown including means in said bore forming an annular shoulder 150 which preferably surrounds each body port and whose radial dimensions are less than those of the pocket. The insert 155 is proportioned with respect to the dimensions of the pocket and shoulder 150 to project into the clearance between the plug and bore to maintain the plug spaced from the bore and shoulder. The bore also includes the pockets 156, the expansion chamber 157 and the shoulder 158 previously described.

The shoulder 150 is preferably integrally cast with the body and is dimensioned with respect to the thickness of the insert to project at least about half way through the thickness thereof. As shown in FIG. 15, the surface 161 of the shoulder adjacent to the port forms a smooth surface which is axially aligned with the run of the port and forms a continuation thereof. The surface 162 of the shoulder adjacent the insert is preferably at an angle with respect to the bore and on a radius $r$ with respect to the longitudinal axis of the bore, or the axis of rotation of the plug.

Shoulder 150 which surrounds each body port cooperates with the corresponding peripheral wall and expansion chamber to prevent movement or extrusion of the insert with respect to the bore and thus substantially completely confines the insert. Additionally, the integral shoulder operates to take the effect of the pressure drop across the rear sides of the inlet port thereby reducing the tendency of the insert to be pulled away from the body during movement of the plug from the open to the closed position. The shoulder may be used with the valve shown in FIGS. 1 to 4 or with that shown in FIGS. 8 to 10 and operates to extend substantially the range of temperature and pressure to which the valve may be exposed.

Satisfactory results have been achieved in accordance with the present invention with inserts wherein the edges thereof intersect a line 50° on each side of a center line drawn along the axis of the plug ports. Thus, the outer surface of the plug is engaged along only 200° of the surface thereof as opposed to 360° as is the case with conventional sleeve valves. In this way, a considerable portion of the plug surface is not engaged by the inserts, and thus the turning torque is reduced considerably.

The inserts may be of pure Teflon or filled Teflon, or they may be of the type described in connection with FIGS. 5 and 6 wherein a metal backing member is used.

Valve constructed in accordance with the present invention offer the advantage of a low turning torque valve by maintaining the area of contact between the plug and the plastic material at a minimum consonant with the requirement that efficient sealing be provided. A valve construction incorporating inserts as described is relatively easy to manufacture and service since the inserts may be positioned within the recesses provided within the bore without any sizing operation. In this way, a number of advantages are achieved from the manufacturing stand point among which is that the valve bodies may be fabricated of relatively brittle materials offering a high degree of corrosion resistance and wherein the interior portions of the bore of the valve need not be machined accurately or subjected to a grinding operation as may be necessary with valves of the prior art.

Valves constructed in accordance with the invention also are capable of being exposed to temperature cycling as may occur during a cleaning operation wherein steam under high pressure is run through the valve for cleaning purposes without loss of effectiveness. Since the insert constructed in accordance with the present invention is maintained within a confined condition either by the provision of a metallic backing member or by the combination of an insert received within a recess provided with an expansion chamber, and provision is made for high and low pressure sealing areas, the effects of cold flow or deformation are minimized and the useful life of the valve as well as the range of temperatures and pressures are extended.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A plug valve for corrosive fluids and the like comprising a metallic body having a tapered bore extending transversely thereof and ports opening into said bore in angularly spaced relation, a metallic tapered valve plug rotatably received in said bore and having a port therethrough for alignment with said body ports, said plug being of sufficiently smaller radial dimensions than said bore to establish an annular clearance between the opposed surfaces thereof, means in said bore defining a pocket surrounding each of said body ports, each said pocket having radial dimensions greater than the radial dimensions of the portions of said bore between said pockets, a polytetrafluoroethylene insert received in sealing relation within each said pocket and having a port therethrough matching the body port, each said insert being proportioned to project into said annular clearance and to engage a portion of the outer surface of said plug to maintain said plug spaced from said bore, said bore including a radially disposed peripheral wall extending completely around each pocket, each said insert and corresponding pocket cooperating with said plug to provide a relatively high pressure sealing area completely surrounding each body port, means cooperating with said bore and said plug to provide a low pressure seal area surrounding said high pressure seal area for permitting lateral expansion of each said insert in response to increases in temperature, each said pocket including an expansion space substantially completely surrounding and spaced from the corresponding body port, said expansion space having a radial dimension greater than the radial dimension of said pocket and cooperating with the plug to provide a low pressure seal area spaced from the corresponding body port, the space between said expansion chamber and the corresponding body port providing in cooperation with said insert and said plug a high pressure sealing area which surrounds said corresponding body port, and means urging said plug into said bore compressing each said insert in said pocket and between said bore and said plug to establish a seal therebetween.

2. A plug valve for corrosive fluids and the like comprising a metallic body having a tapered bore extending transversely thereof and ports opening into said bore in angularly spaced relation, a metallic tapered valve plug rotatably received in said bore and having a port therethrough for alignment with said body ports, said plug being of sufficiently smaller radial dimensions than said bore to establish an annular clearance between the opposed surfaces thereof, means in said bore defining a pocket surrounding each of said body ports, each said pocket having radial dimensions greater than the radial dimension of the portions of said bore between said pockets, a polytetrafluoroethylene insert received in sealing relation within each said pocket and having a port therethrough matching the body port, each said insert being proportioned to project into said annular clearance and to engage a portion of the outer surface of said plug to maintain said plug spaced from said bore, said bore including a radially disposed peripheral wall extending completely around each pocket, each said insert and corresponding pocket cooperating with said plug to provide a relatively high pressure sealing area completely surrounding each body port, means cooperating with said bore and said plug to provide a low pressure seal area surrounding said high pressure seal area for permitting lateral expansion of each said insert in response to increases in temperature, each said insert including a relatively rigid backing member having multiple perforations therethrough, a layer of polytetrafluoroethylene overlying at least the surface of said rigid backing member facing said plug, said layer including portions projecting into each perforation in said backing member and including a portion extending beyond the outer periphery of said backing member, the portions of said layer overlying the nonperforated portions of said backing cooperating with said plug to provide said high pressure seal area, the extending portion of said layer cooperating with said plug to provide said low pressure seal area, and means urging said plug into said bore compressing each said insert in said pocket and between said bore and said plug to establish a seal therebetween.

3. A plug valve for corrosive fluids and the like comprising a body including means defining a bore extending transversely thereof and ports opening into said bore in angularly spaced relation, a valve plug rotatably received in said bore and having a port therethrough for alignment with said body ports, said plug being of sufficiently smaller radial dimensions than said bore to establish an annular clearance between the opposed surfaces thereof, the bore of said valve including means defining a pair of spaced pockets, each of said pockets having a radial dimension greater than the radial dimension of the portions of said bore between said pockets, an insert of plastic material capable of cold flowing and having a relatively low coefficient of friction with respect to said plug received in sealing relation within each said pocket, each said insert being of a thickness sufficient to project into said clearance for sealing engagement with said plug, a port in each said insert communicating with the corresponding body port, each said pocket including means defining a communicating expansion chamber for allowing expansion of said corresponding insert and a substantially radially extending peripheral wall for preventing cold flow of said insert into said clearance, means maintaining said plug in sealing engagement with each said insert, means in said bore defining an annular shoulder surrounding each body port, and each said shoulder interfitting with the corresponding ports of each said insert and cooperating with the corresponding expansion chamber to prevent movement of the insert with respect to said body and flow into said body ports.

4. A plug valve comprising a body of relatively nonmachinable relatively brittle corrosion resistant metal having a tapered bore extending transversely thereof and ports opening into said bore in angularly spaced relation, a tapered metallic valve plug received in said bore and having a port therethrough for alignment with said body ports, means cooperatively associated with said plug for effecting movement thereof between open and closed positions with respect to said body ports, said plug being of sufficiently smaller radial dimension than said bore to establish an annular clearance between the opposed surfaces thereof, means cast in said body defining a pocket surrounding each of said body ports and having radial dimensions greater than the radial dimensions of portions of said bore between said pockets, a member of fluorocarbon resin material received within each said pocket and having a port therethrough communicating with the corresponding body port, means urging said tapered plug into said tapered bore compressing each said member in said pocket and between said bore and said plug, each said member including an inner sealing surface extending into said annular clearance and engaging at least a portion of the outer surface of said plug with said plug in the closed position, each said pocket including means defining a communicating expansion chamber for allowing expansion of said corresponding member and a substantially radially extending peripheral wall for preventing cold flow of said resin material into said annular clearance, and the radial dimension of each said communicating expansion chamber being greater than the radial dimensions of the pockets.

5. A plug valve as set forth in claim 4 wherein the port of each member includes edge portions exposed to and opposing line pressure, means establishing a limited range of rotational movement of said plug in one direction from the open position to the closed position, and said plug and said member surrounding said inlet port and said body being so constructed and arranged that during said rotational movement of said plug from the open to the closed position the outlet port of said body closes entirely while the interior of said plug port continues in direct fluid receiving relation with said inlet port of said body.

6. A plug valve for corrosve fluids and the like comprising a body having a bore extending transversely thereof and ports opening into said bore in angularly spaced relation, a valve plug rotatably received in said bore and having a port therethrough for alignment with said body ports, said plug being of sufficiently smaller radial dimensions than said bore to establish an annular clearance between the opposed surfaces thereof, means in said bore defining a pocket surrounding each of said body ports, said body including an annular shoulder forming the inner end of each said body port and projecting into said clearance, each said pocket having radial dimensions greater than the radial dimensions of the portions of said bore between said pockets, the radial dimension of the body bore in the area of said shoulders being less than the radial dimensions of said bore and pockets, a member received in sealing relation within each said pocket and having a port therethrough aligned with the body port, each said member including an inner sealing surface extending into said annular clearance and engaging a portion of the outer surface of said plug to maintain said plug spaced from said annular shoulders, said bore including a radially extending peripheral wall bordering substantially all the way around each pocket, each said member and said pocket cooperating with said plug to provide a relatively high pressure sealing area substantially completely surrounding each body port, means cooperating with said bore and said plug to provide a low pressure seal area adjacent to said high pressure seal area for permitting expansion of a portion of each said member in response to increases in temperature, means urging said plug into said bore compressing each said member in said pocket and between said bore and said plug to establish a seal therebetween, and each said shoulder interfitting with the corresponding ports of each said member to confine said member against movement with respect to said body and flow into said body ports.

7. A plug valve for corrosive fluids and the like comprising a metallic body having a bore extending transversely thereof and inlet and outlet ports opening into said bore in angularly spaced relation, a metallic valve plug rotatably received in said bore and having a port therethrough for alignment with said body ports, said plug being of sufficiently smaller radial dimensions than said bore to establish an annular clearance between the opposed surfaces thereof, means in said bore defining a pocket surrounding each of said body ports, means in said bore defining an annular shoulder surrounding each body port, each said pocket having radial dimensions greater than the radial dimensions of the portions of said bore between said pockets, the radial dimensions of each said shoulder being less than the radial dimension of each said pocket, a polytetrafluoroethylene insert received in sealing relation within each said pocket and having a port therethrough aligned with the body port, each said insert being proportioned with respect to the depth of the corresponding pocket and the dimension of said annular clearance to engage a portion of the outer surface of said plug and maintain it spaced from the bore, said bore including a radially extending peripheral wall bordering substantially all the way around each pocket, each said insert and said pocket cooperating with said plug to provide a relatively high pressure sealing area substantially completely surrounding each body port, means in each said pocket defining an expansion chamber communicating therewith and cooperating with said bore and said plug to provide a low pressure seal area adjacent to said high pressure seal area for permitting expansion of a portion of each said member in response to increases in temperature, means urging said plug into said bore compressing each said member in said pocket and between said bore and said plug to establish a seal therebetween, and each said shoulder interfitting with the corresponding ports of each said insert and cooperating with the corresponding expansion chamber and peripheral wall to confine the insert against movement with respect to said body and flow into said body ports.

8. A plug valve for corrosive fluids and the like comprising a body of relatively non-machinable relatively brittle corrosion resistant metal having a tapered bore extending transversely thereof and ports opening into said bore in angularly spaced relation, a tapered metallic valve plug rotatably received in said bore and having a port therethrough for alignment with said body ports, said plug being of sufficiently smaller radial dimensions than said bore to establish an annular clearance between the opposed surfaces thereof, means cast in said bore defining a pocket surrounding each of said body ports and having radial dimensions greater than the radial dimensions of the portions of said bore between said pockets, a plastic member received in sealing relation within each said pocket and having a port therethrough matching the body port, said plastic member having a coefficient of thermal expansion greater than that of said metal body and exhibiting a tendency to cold flow, means in said bore defining an integrally cast shoulder surrounding each said body port, the radial dimensions of each said shoulder being less than the radial dimensions of each said pocket, each said member including an inner sealing surface extending into said annular clearance and engaging a portion of the outer surface of said plug to maintain said plug spaced from said bore and said shoulders, each said pocket including a radially extending peripheral wall, each said member and said pocket cooperating with said plug to provide a relatively high pressure sealing area substantially completely surrounding each body port, means in each said pocket defining an expansion chamber cooperating with said bore and said plug to provide a low pressure seal area adjacent to said high pressure seal area for permitting expansion of a portion of each said member in response to increases in temperature, means urging said plug into said bore compressing each said member in said pocket and between said bore and said plug to establish a seal therebetween, and each said shoulder interfitting with the corresponding ports of each said member and cooperating with the corresponding expansion chamber and peripheral wall to confine the member against movement with respect to said body and flow into said body port.

9. A plug valve for corrosive fluids and the like comprsing a metal body having a bore extending transversely thereof and ports opening into said bore in angularly spaced relation, a metal valve plug rotatably received in said bore and having a port therethrough for alignment with said body ports, said plug being of sufficiently smaller radial dimensions than said bore to establish an annular clearance between the opposed surfaces thereof, means cast in said bore defining a pocket surrounding each of said body ports and having radial dimensions greater than the radial dimensions of the portions of said bore between said pockets, a polytetrafluoroethylene insert received in sealing relation within each said pocket and having a port therethrough matching the body port, means in said bore definng an integrally cast shoulder surrouding each said body port, the radial dimensions of each said shoulder being less than the radial dimensions of each said pocket, one surface of each said shoulder being axially aligned with the corresponding body port, the other surface of said shoulder being on a radial line from the center axis of said bore and angularly disposed relative to said first surface, each said insert including an inner sealing surface extending into said annular clearance and engaging a portion of the outer surface of said plug to maintain said plug spaced from said bore and said shoulders, said bore including a radially extending peripheral wall bordering substantially all the way around each pocket, each said insert and said pocket cooperating with said plug to provide a relatively high pressure sealing area substantially completely surrounding each body port, means in each said pocket defining an expansion chamber cooperating with said bore and said plug to provide a low pressure seal area adjacent to said high pressure seal area for permitting expansion of a portion of each said insert in response to increases in temperature, means urging said plug into said bore compressing each said insert in said pocket and between said bore and said plug to establish a seal therebetween, and each said shoulder interfitting with the corresponding ports of each said insert and cooperating with the corresponding expansion chamber and peripheral wall to confine the insert against movement with respect to said body and flow into said body port.

References Cited

UNITED STATES PATENTS

| | | | |
|---|---|---|---|
| 2,987,295 | 6/1961 | Schenck et al. | 251—288 |
| 3,151,836 | 10/1964 | Haddick et al. | 251—317 X |
| 3,160,387 | 12/1964 | Windsor | 251—317 X |
| 3,216,697 | 11/1965 | Holmberg | 251—317 X |

M. CARY NELSON, *Primary Examiner.*

E. K. FEIN, *Assistant Examiner.*

UNITED STATES PATENT OFFICE
CERTIFICATE OF CORRECTION

Patent No. 3,326,519 June 20, 1967

Jacob B. Freed

It is hereby certified that error appears in the above numbered patent requiring correction and that the said Letters Patent should read as corrected below.

Column 4, line 24, for "thicknes" read -- thickness --; column 5, line 67, beginning with "thereof" strike out all to and including "material" in line 68, same column 5, and insert instead -- portions without any significant change in shape or dimensions. For a further discussion of such a plastic article, --; column 14, lines 7 and 8, for "comprsing" read -- comprising --; line 21, for "surrouding" read -- surrounding --.

Signed and sealed this 18th day of June 1968.

(SEAL)
Attest:

Edward M. Fletcher, Jr.
Attesting Officer

EDWARD J. BRENNER
Commissioner of Patents